United States Patent [19]

Muehlbauer et al.

[11] Patent Number: 5,563,226
[45] Date of Patent: Oct. 8, 1996

[54] PROCESS FOR MAKING PHOTOGRAPHIC POLYMERIC MATTE BEAD PARTICLES

[75] Inventors: John L. Muehlbauer; Dennis E. Smith, both of Rochester, N.Y.

[73] Assignee: Eastman Kodak Company, Rochester, N.Y.

[21] Appl. No.: 330,406

[22] Filed: Oct. 28, 1994

[51] Int. Cl.⁶ ............................................. C08F 2/18
[52] U.S. Cl. ..................... 526/173; 526/199; 526/225; 526/909
[58] Field of Search ................ 524/157; 526/173, 526/199, 225, 909

[56] References Cited

U.S. PATENT DOCUMENTS

| | | | |
|---|---|---|---|
| 2,932,629 | 4/1960 | Wiley | 526/226 |
| 4,022,622 | 5/1977 | Timmerman et al. | 430/916 |
| 4,447,525 | 5/1984 | Vallarino et al. | |
| 4,855,219 | 8/1989 | Bagchi et al. | |
| 5,057,407 | 10/1991 | Okamura et al. | |

FOREIGN PATENT DOCUMENTS 0370405  5/1990  European Pat. Off. .

OTHER PUBLICATIONS

J. Ugelstad, M. S. El–Aasser, & J. W. Vanderhoff, *J. Polym. Lett. Ed.*, 11 (1973) pp. 505–513.

Primary Examiner—Jeffrey T. Smith
Attorney, Agent, or Firm—Robert A. Gerlach

[57] ABSTRACT

A process of making polymeric matte bead particles for use in photographic elements which comprises forming a suspension of ethylenically unsaturated monomer droplets in an aqueous media, subsequent to the formation of droplets and before commencement of reaction, adding to the aqueous media an effective amount of a hydrophilic colloid to improve adhesion and polymerizing the monomer to form solid polymeric particles.

16 Claims, No Drawings

PROCESS FOR MAKING PHOTOGRAPHIC POLYMERIC MATTE BEAD PARTICLES

BACKGROUND OF THE INVENTION

1. Field of the Invention

This invention relates to a method of making polymeric matte bead particles for use in photographic elements, and more particularly to a method of making matte bead particles having improved adhesion in hydrophilic colloid layers.

In the preparation of photographic elements, there is an ongoing need to utilize polymeric matte particles having a narrow particle size distribution, while at the same time, having improved adhesion to the hydrophilic colloid layer containing the matte particles during processing of the film. That is, the matte particles should be tightly bound to the binder which, in addition to the matte, forms a layer of the photographic element.

2. Description of Related Art

Polymeric particles are typically made by dispersing polymerizable liquid monomer droplets in a continuous aqueous medium. Solid polymer particles are formed by reacting the monomer to a solid polymer. A surface active material is included to stabilize the dispersion. Lyophilic polymers including starch, natural gums, polyvinyl alcohol, gelatin, and the like have all been used as stabilizers for the polymerizable liquid monomer droplets. This technique is set forth in U.S. Pat. No. 2,932,629, which is representative for preparing polymeric particles.

It has been found, however, that the inclusion of hydrophilic colloids generally and gelatin, in particular, when added to monomer droplet dispersions in water for the purpose of stabilizing the monomer droplet dispersions, produces particle size distributions that are broad and not reproducible. Also, the mean particle size is affected by the amount of hydrophilic colloid present and the amount of hydrophilic colloid that can be used is limited by the rheology of system.

SUMMARY OF THE INVENTION

The invention herein contemplates a process of making polymeric matte bead particles for use in photographic elements. The polymeric matte bead particles demonstrate improved adhesion in the photographic element during manfacture and even through the processing of the photographic element and subsequent thereto. The process includes forming a suspension or dispersion of ethylenically unsaturated monomer droplets in an aqueous media, subsequent to the formation of the droplets and before the commencement of the polyaddition reaction, adding to the aqueous media an effective amount of a hydrophilic colloid to improve adhesion and polymerizing the monomer to form solid polymeric particles.

DETAILED DESCRIPTION OF THE INVENTION

While applicants do not wish to be bound by any theory with respect to the mechanism by which adhesion to a photographic element is achieved by the method in accordance with this invention, it is believed that the hydrophilic colloid generally, and gelatin, in particular, in some manner binds itself to the surface of the monomer droplet, thereby contributing to the improvement in adhesion when the polymeric matte particles are incorporated into a photographic element in a layer of the element containing gelatin as a binder. Further, as a result of the addition of the hydrophilic colloid after the formation of the monomer droplet suspension, but before the polymerization of the monomer droplets takes place, more uniformly sized polymeric particles result. The particle size distribution, in particularly the oversized particles, are greatly reduced in number and therefore, it is theorized that this also aids in the improved adhesion as the presence of oversized particles generally results in poor adhesion. The particle size distribution is much broader when gelatin is added before dispersing the monomer droplets and further the monomer droplet size obtained is not reproducible from run to run.

In the practice of the method in accordance with this invention, a suspension in water of any ethylenically unsaturated monomer or mixture of monomers is formed. This may be brought about by passing the dispersion through a mechanical shearing device such as a high pressure homogenizer, a colloid mill, an agitator, an ultrasonic horn, and the like, to achieve an oil in water dispersion of the monomer droplets. Preferably, a suspension stabilizing agent is added to the aqueous media prior to passing through the mechanical shearing device. The dispersion is placed into a suitable container and at this time, a hydrophilic colloid, such as gelatin, polyvinyl alcohol, polyvinyl pyrrolidone, starch, natural gum, and the like, is added. The hydrophilic colloid is used in an effective amount to improve adhesion of the polymeric matte particles to the photographic element and reduce scumming of processing solutions and printer dusting. The effective amount is somewhat dependent on the surface area of the polymeric matte particles. A preferred amount is at least about 0.1 weight percent and most preferable at least about 0.5 weight percent based on the weight of the monomer. The upper limit of the quantity of the hydrophilic colloid is controlled by practical considerations, such as viscosity and economic considerations. Gelatin is the preferred hydrophilic colloid. The contents of the container are then heated in order to bring about the polyaddition reaction of the monomer or the monomers present and to form polymeric particles.

Any suitable ethylenically unsaturated monomer or mixture of monomers may be used in the practice of this invention, such as, vinyl substituted aromatic compounds, such as styrene, vinyl toluene, p-chlorostyrene, vinylbenzylchloride or vinyl naphthalene; ethylenically unsaturated mono-olefins, such as ethylene, propylene, butylene, or isobutylene; vinyl halides, such as vinyl chloride, vinyl bromide, vinyl fluoride; vinyl esters, such as, vinyl acetate, vinyl propionate, vinyl benzoate, or vinyl butyrate; esters of α-methylene monocarboxylic acids, such as methyl acrylate, ethyl acrylate, n-butyl acrylate, n-octyl acrylate, 2-chloroethyl acrylate, phenyl acrylate, methyl-α-chloroacrylate, methyl methacrylate, ethyl methacrylate, butyl methacrylate; acrylonitrile, methacrylonitrile, acrylamide, isopropylacrylamide, dimethylacrylamide; vinyl ethers, such as vinyl methyl ether, vinyl isobutyl ether, and vinyl ethyl ether; vinyl ketones, such as vinyl methyl ketone, vinyl hexyl ketone, and methyl isopropenyl ketone; acrolein; vinylidene halides, such as vinylidene chloride and vinylidene chlorofluoride; and N-vinyl compounds such as N-vinylpyrrolidone, N-vinyl pyrrole, N-vinyl carbazole, and N-vinyl indole; mixtures thereof and the like.

If desired, a suitable crosslinking monomer may be used in forming polymer droplets by polymerizing a monomer or monomers within droplets in accordance with this invention to thereby modify the polymeric particle and produce particularly desired properties. Typical crosslinking monomers are aromatic divinyl compounds such as divinylbenzene, divinylnaphthalene or derivatives thereof; diethylene carboxylate esters and amides such as diethylene glycol bis-(methacrylate), diethylene glycol diacrylate, and other divinyl compounds such as divinyl sulfide or divinyl sulfone compounds.

Preferably, a catalyst or initiator which is soluble in the monomer droplets may be utilized in the process of the invention. Typical initiators for polymerization are the peroxide and azo initiators. Among those found suitable for use in the process of the invention are 2,2' azobis (2,4-dimethyl valeronitrile), 2,2' azobis (isobutyronitrile), lauroyl peroxide, benzoyl peroxide and the like which result in complete polymerization without leaving detrimental residual materials. Chain transfer agents may also be added to the monomer to control the properties of the polymer particles formed.

Any suitable suspension stabilizing agent may be used such as, for example, anionic particulate suspension stabilizing agents such as, silica, clays, talcs, and the like, as set forth in U.S. Pat. No. 5,288,598 herein incorporated by reference; surfactants including anionic, cationic and non-ionic surfactants, such as sulfonated alkyl aryl polyethers, ethylene glycol ethers of polyhydric alcohols, carboxy alkyl-substituted polyglycol ethers and esters, fluoro-substituted compounds, sucrose esters of aliphatic acids, maleic ester amides, sodium salt of the condensation product of naphthalene sulfonic acid and formaldehyde, phosphate esters of glycidol polyethers, long chain sucrose ethers, higher alcohol sulfates, water soluble salts of aliphatic esters of sulfo-succinic acid, fatty acid esters of hydroxy alkyl sulfonic acids, amide and ester derivatives of sulfo-acetic acid, alpha-sulfo lower alkyl esters of $C_7$ to 18 carbon atoms, fatty acids, and sulfate ester products of a glycidol polyether, and the like. Suitable surfactants are described in Section 11 of Research Disclosure 308119 published December 1989. A preferred surfactant is sodium dioctyl sulfosuccinate.

In a preferred embodiment of this invention, a nonreactive compound, more hydrophobic than the ethylenically unsaturated monomer in the monomer droplets is added in order to more closely control the particle size of the polymeric particles formed. A convenient manner of defining the hydrophobicity of materials is by calculating the log of the octanol/water partition coefficient ($logP_{(calc)}$), the higher the numerical value, the more hydrophobic is the compound. Thus, the nonreactive compound will have a $logP_{(calc)}$ greater than the $logP_{(calc)}$ of the most hydrophobic ethylenically unsaturated monomer present. Preferably, the difference in $logP_{(calc)}$ of the monomer and the nonreactive compound (D $logP_{(calc)}$) should be at least 1 and most preferably at least 3 to achieve the most uniform particle size with the lowest values for particle size distribution.

As indicated above, the nonreactive compound is more hydrophobic than that of the monomer and has a higher $logP_{(calc)}$ than the monomer. $LogP_{(calc)}$ is the logarithm of the value of the octanol/water partition coefficient (P) of the compound calculated using MedChem, version 3.54, a software package available from the Medicinal Chemistry Project, Pomona College, Claremont, Calif. $LogP_{(calc)}$ is a parameter which is highly correlated with measured water solubility for compounds spanning a wide range of hydrophobicity. $LogP_{(calc)}$ is a useful means to characterize the hydrophobicity of compounds. The nonreactive compounds used in this invention are either liquid or oil soluble solids and have a $logP_{(calc)}$ greater than any of the ethylenically saturated monomers present. Suitable nonreactive, hydrophobic compounds are those selected from the following classes of compounds:

I. Saturated and unsaturated hydrocarbons and halogenated hydrocarbons, including alkanes, alkenes, alkyl and alkenyl halides, alkyl and alkenyl aromatic compounds, and halogenated alkyl and alkenyl aromatic compounds, especially those having a $logP_{calc}$ greater than about 3, II. alcohols, ethers, and carboxylic acids containing a total of about 10 or more carbon atoms, especially those having a $logP_{calc}$ greater than about 3, III. esters of saturated, unsaturated, or aromatic carboxylic acids containing a total of about 10 or more carbon atoms, especially those having a $logP_{calc}$ greater than about 3, IV. amides of carboxylic acids having a total of 10 or more carbon atoms, especially those having a $logP_{calc}$ greater than about 3, V. esters and amides of phosphorus- and sulfur-containing acids having a $logP_{calc}$ greater than about 3, and other compounds of similar hydrophobicity.

Compounds of Class I include: straight or branched chain alkanes such as, for example, hexane, octane, decane, dodecane, tetradecane, hexadecane, octadecane, 2,2,6,6,9,9-hexamethyldodecane, eicosane, or triacontane; alkenes such as, for example, heptene, octene, or octadecene; substituted aromatic compounds such as, for example, octylbenzene, nonylbenzene, dodecylbenzene, or 1,1,3,3-tetramethylbutylbenzene; haloalkanes such as, for example, heptyl chloride, octyl chloride, 1,1,1-trichlorohexane, hexyl bromide, 1,11-dibromoundecane, and halogenated alkyl aromatic compounds such as, for example, p-chlorohexylbenzene and the like.

Compounds of Class II include: decanol, undecanol, dodecanol, hexadecanol, stearyl alcohol, oleyl alcohol, eicosanol, di-t-amyl phenol, p-dodecylphenol, and the like; lauric acid, tetradecanoic acid, stearic acid, oleic acid, and the like; methyldodecylether, dihexyl ether, phenoxytoluene, and phenyldodecyl ether; and the like.

Compounds of Class III include: methyl laurate, butyl laurate, methyl oleate, butyl oleate, methyl stearate, isopropyl palmitate, isopropyl stearate, tributyl citrate, acetyl tributyl citrate, 3-( 4-hydroxy-3,5-di-t-butylphenyl)propionic octadecyl ester (commercially available under the trademark Irganox 1076), 2-ethylhexyl-p-hydroxylbenzoate, phenethyl benzoate, dibutyl phthalate, dioctyl phthalate, dioctyl terephthalate, bis(2-ethylhexyl) phthalate, butyl benzyl phthalate, diphenyl phthalate, dibutyl sebacate, didecyl succinate, and bis(2-ethylhexyl) azelate and the like.

Compounds of Class IV include: lauramide, N-methyl-lauramide, N,N-dimethyllauramide, N,N-dibutyllauramide, N-decyl-N-methylacetamide, and N-oleylphthalimide and the like.

Compounds of Class V include, for example, sulfates, sulfonates, sulfonamides, sulfoxides, phosphates, phosphonates, phosphinates, phosphites, or phosphine oxides. Particular examples include diesters of sulfuric acid, such as, for example, dihexylsulfate, didecylsulfate, and didodecylsulfate; esters of various alkyl sulfonic acids including, for example, methyl decanesulfonate, octyl dodecanesulfonate, and octyl p-toluenesulfonate; sulfoxides, including, for example, bis(2-ethylhexyl)sulfoxide; and sulfonamides, including, for example, N-(2-ethylhexyl)-p-toluenesulfonamide, N-hexadecyl-p-toluenesulfonamide, and N-methyl-N-dodecyl-p-toluenesulfonamide. Phosphorus-containing compounds include, for example, triesters of phosphoric acid such as, for example, triphenyl phosphate, tritolylphosphate, trihexylphosphate, and tris(2-ethylhexyl)phosphate; various phosphonic acid esters, such as, for example, dihexyl hexylphosphonate, and dihexyl phenylphosphonate;

phosphite esters such as tritolylphosphite, and phosphine oxides such as trioctylphosphine oxide.

Representatives compounds are given below, along with their $logP_{calc}$ value, calculated using the above-mentioned MedChem software package (version 3.54). This software package is well-known and accepted in the chemical and pharmaceutical industries.

| | $LogP_{calc}$ |
|---|---|
| Nonreactive Compound | |
| hexane | 3.87 |
| octane | 4.93 |
| decane | 5.98 |
| dodecane | 7.04 |
| hexadecane | 9.16 |
| dimethylphthalate | 1.36 |
| dibutylphthalate | 4.69 |
| bis(2-ethylhexyl)phthalate | 8.66 |
| dioctylphthalate | 8.92 |
| tritolylphosphate | 6.58 |
| tris(2-ethylhexyl)phosphate | 9.49 |
| dodecylbenzene | 8.61 |
| bis (2-ethylhexyl) azelate | 9.20 |
| trioctylphosphine oxide | 9.74 |
| dinonyl phthalate | 9.98 |
| didecyl phthalate | 11.04 |
| didodecyl phthalate | 13.15 |
| 3-(4-hydroxy-3, 5-di-t-butylphenyl)-propionic acid, octadecyl ester | 14.07 |
| trioctyl amine | 10.76 |
| Monomer | |
| acrylic acid | 0.16 |
| isopropyl acrylamide | 0.20 |
| β-(hydroxyethyl) methacrylate | 0.25 |
| vinyl acetate | 0.59 |
| methyl acrylate | 0.75 |
| methyl methacrylate | 1.06 |
| ethyl acrylate | 1.28 |
| ethyl methacrylate | 1.59 |
| butyl acrylate | 2.33 |
| butyl methacrylate | 2.64 |
| styrene | 2.89 |
| mixture of vinyl toluenes | 3.37 |
| 2-ethylhexyl acrylate | 4.32 |
| 2-ethylhexyl methacrylate | 4.62 |
| t-butylstyrene | 4.70 |

The hydrophobic compound is employed in an amount of at least about 0.01, preferably at least about 0.05 and most preferably at least about 0.5 percent by weight based on the weight of the monomer with the upper limit being 5 percent. Of these compounds, hexadecane is preferred.

The invention will be further illustrated by the following examples.

EXAMPLES

Preparation 1 (Invention)

To a mixture of 560 g vinyl toluene and 140 g divinyl benzene is added 18.3 g Aerosol OT-100 (sodium dioctyl sulfosuccinate), sold by American Cyanamide, 14 g lauroyl peroxide and 7 g hexadecane. This mixture is then added to 3,190 g distilled water and stirred for 5 minutes followed by passing through a Gaulin colloid mill running at 3,600 rpm, 0.01" gap and 1 gal/min feed rate. 3,500 g of this milled suspension is put into a 5 liter round bottom flask and 260 g of deionized Type IV gelatin at 50% water is added. This is then reacted for 16 hours at 67° C. and 100 rpm stirring. The flask is then heated to 80° C. for 2 hours and cooled. 2.0 g of 0.7% Kathon LX solution is added as a biocide (sold by Rohm and Haas).

Preparation 2 (Invention)

To a mixture of 800 g vinyl toluene and 200 g divinyl benzene is added 20 g Aerosol OT-100 (sodium dioctyl sulfosuccinate), 20 g lauroyl peroxide and 10 g hexadecane. This mixture is then added to 3,190 g distilled water and stirred for 5 minutes followed by passing through a Gaulin colloid mill running at 3,000 rpm, 0.01" gap and 1 gal/min feed rate. 3,500 g of this milled suspension is put into a 5 liter round bottom flask and 160.6 g of deionized Type IV gelatin at 50% water is added. This is then reacted for 16 hours at 67° C. and 100 rpm stirring. The flask is then heated to 80° C. for 2 hours and cooled. 2.0 g of a 0.7% Kathon LX biocide solution is added.

Preparation 3 (Invention)

To a mixture of 560 g vinyl toluene and 140 g divinyl benzene is added 18.3 g Aerosol OT-100 (sodium dioctyl sulfosuccinate), 14 g lauroyl peroxide and 7 g hexadecane. This mixture is then added to 3,190 g distilled water and stirred for 5 minutes followed by passing through a Gaulin colloid mill running at 2,400 rpm, 0.01" gap and 1 gal/min feed rate. 3,500 g of this milled suspension is put into a 5 liter round bottom flask and 86.5 g of deionized Type IV gelatin at 50% water is added. This is then reacted for 16 hours at 67° C. and 100 rpm stirring. The flask is then heated to 80° C. for 2 hours and cooled. 2.0 g of a 0.7% Kathon LX solution is added as a biocide.

Preparation 4 (Invention)

To a mixture of 560 g vinyl toluene and 140 g divinyl benzene is added 9.24 g Aerosol OT-100 (sodium dioctyl sulfosuccinate), 14 g lauroyl peroxide and 7 g hexadecane. This mixture is then added to 3,190 g distilled water and stirred for 5 minutes followed by passing through a Gaulin colloid mill running at 2,400 rpm, 0.01" gap and 1 gal/min feed rate. 3,500 g of this milled suspension is put into a 5 liter round bottom flask and 86.5 g of deionized Type IV gelatin at 50% water is added. This is then reacted for 16 hours at 67° C. and 100 rpm stirring. The flask is then heated to 80° C. for 2 hours and cooled. 2.0 g of a 0.7% Kathon LX solution is added as a biocide.

Preparation 5 (Invention)

To a mixture of 350 g vinyl toluene and 650 g methyl methacrylate is added 26.84 g Aerosol OT-100 (sodium dioctyl sulfosuccinate) and 14 g lauroyl peroxide. This mixture is then added to 3,190 g distilled water and stirred for 5 minutes followed by passing through a Gaulin colloid mill running at 3,600 rpm, 0.01" gap and 1 gal/min feed rate. 2,660 g of this milled suspension is put into a 5 liter round bottom flask and 121.5 g of deionized Type IV gelatin at 50% water is added. This is then reacted for 16 hours at 70° C. and 100 rpm stirring. The flask is then heated to 85° C. for 2 hours and cooled.

Preparation 6 (Invention)

To 1,000 g methyl methacrylate is added 4.0 g Aerosol OT-100 (sodium dioctyl sulfosuccinate) and 12 g lauroyl peroxide. This mixture is then added to 3,190 g distilled water and stirred for 5 minutes followed by passing through a Gaulin colloid mill running at 3,600 rpm, 0.01" gap and 1 gal/min feed rate. 3,000 g of this milled suspension is put into a 5 liter round bottom flask and 140 g of deionized Type IV gelatin at 50% water is added. This is then reacted for 16 hours at 70° C. and 125 rpm stirring. The flask is then heated to 85° C. for 3 hours and cooled.

Preparation 7 (Invention)

To a mixture of 380 g vinyltoluene and 95.2 g divinyl benzene is added 11.9 g Aerosol OT-100 (sodium dioctyl sulfosuccinate), 7.2 g lauroyl peroxide and 4.7 g hexadecane. This mixture is then added to 1123 g distilled water and stirred 5 minutes followed by passing through a Gaulin colloid mill running at 3600 RPM, 0.01" gap and 1 gallon/minute feed rate. 1500 g of this milled suspension is put into a 2 liter round bottom flask and 15.2 g of deionized Type IV gelatin at 65 percent water is added. This is then reacted for 16 hours at 67° C. and 100 RPM stirring. The flask is then heated to 80° C. for 2 hours and cooled. 2 g of a 0.7% Kathon LX solution is added as a biocide.

Preparation 8 (Control)

Polymethyl methacrylate matte made using lauroyl peroxide as the initiator and Aerosol OT-100 (sodium dioctyl sulfosuccinate) as the suspending agent is used as a control. Neither hexadecane nor gelatin is used in the preparation.

The mattes of Preparation 1–7 are coated on a support and processed. Matte adhesion is evaluated by examining the surface of each sample with an optical microscope and counting the number of craters or pits on the surface left by removed matte per unit area. Results are shown in Table I.

TABLE I

| PREP-ARATION | SIZE (microns) | AMOUNT COATED (mg/ft²) | PITS (#/1.16 mm) |
| --- | --- | --- | --- |
| 1 (invention) | 1.5 | 20 | 5 |
| 2 (invention) | 2.0 | 20 | 8 |
| 3 (invention) | 2.5 | 20 | 0 |
| 4 (invention) | 3.1 | 20 | 0 |
| 5 (invention) | 1.0 | 10 | 0 |
| 6 (invention) | 1.5 | 10 | 0 |
| 7 (invention) | 1.2 | 5 | 7 |
| 8 (control) | 2.5 | 20 | 87 |

The data in Table I show that polymeric mattes made from both styrenic and acrylic monomers have improved adhesion from addition of gelatin after forming the monomer droplet dispersion but before polymerizing the monomers.

Preparation 9 (Control)

To 950 g vinyl toluene is added 5.0 g Aerosol OT-100 (sodium dioctyl sulfosuccinate), and 4.8 g of 2,2' azobis (isobutyronitrile) sold by DuPont under the trade designation Vazo 64. In a separate beaker, 101 g of 89% (dry) deionized Type IV gelatin is dissolved in 2936 g distilled water at 40° C. The organic phase is added to the gelatin solution at 35° C. and stirred for 5 minutes followed by passing through a Gaulin colloid mill running at 3,600 rpm, 0.006" gap and 1 gal/min feed rate. This mixture is reacted overnight at 70° C. and 100 rpm stirring. The next day, 2.2 g Kathon LX 1.5% was added as a biocide.

Preparation 10 (Control)

The procedure of Preparation 8 is repeated except 182 g of Deionized Type IV gelatin at 50% water is used.

Preparation 11 (Control)

To 950 g vinyl toluene is added 5.0 g Aerosol OT-100 (sodium dioctyl sulfosuccinate), and 4.8 g Vazo 64 from DuPont. In a separate beaker, 101 g of 89% (dry) phthalated gel is dissolved in 2936 g distilled water at 40° C. Phthalated gel is lime processed ossein gelatin that has been reacted with 5 grams of phthalic anhydride per 100 grams of gelatin. The organic phase is added to the gelatin solution at 25° C. and stirred for 5 minutes followed by passing through a Gaulin colloid mill running at 3,600 rpm, 0.006" gap and 1 gal/min feed rate. This mixture is reacted overnight at 70° C. and 100 rpm stirring. The next day, 2.2 g Kathon LX 1.5% was added as a biocide.

Preparation 12 (Invention)

To 3,800 g vinyl toluene is added 30 g Aerosol OT-100 (sodium dioctyl sulfosuccinate) and 19.2 g Vazo 64 from DuPont. This mixture is then added to 12,144 g distilled water and stirred for 5 minutes at room temperature followed by passing through a Gaulin colloid mill running at 3,500 rpm, 0.008" gap and 1 gal/min feed rate. 3,500 g of this milled suspension is put into a 5 liter round bottom flask and 160 g of deionized Type IV gelatin at 50% water is added. This is then reacted for 2 hours at 40° C. followed by 16 hours at 70° C. with 105 rpm stirring. The flask is then cooled and 2.0 g Kathon LX 1.5% was added as a biocide.

The particle size is measured by Coulter Multisizer as shown in Table II.

TABLE II

| PREPARATION | VOLUME MEAN SIZE (microns) | WIDTH* INDEX |
| --- | --- | --- |
| 9 (control) | 2.74 | 1.64 |
| 10 (control) | 2.08 | 1.31 |
| 11 (control) | 4.38 | 2.0 |
| 12 (invention) | 1.83 | 1.29 |

*The Width Index is a measure of the breadth of the particle size distribution. The following equation describes the Width Index, $$\frac{\frac{D_{50}}{D_{16}} + \frac{D_{84}}{D_{50}}}{2}$$

where $D_{16}$ is the diameter where 16% of the total mass of particles is smaller; $D_{50}$ is the diameter where 50% of the total mass of particles is smaller; and $D_{84}$ is the diameter where 84% of the total mass of particles is smaller. Thus, the smaller the Width Index, the narrower the distribution.

The data in Table II shows that the particle size distribution as measured by width index is generally broader when gelatin is added before milling and results are not reproducible.

What is claimed is:

1. A process of making polymeric matte bead particles for use in photographic elements which comprises forming a suspension of ethylenically unsaturated monomer droplets in an aqueous media, subsequent to the formation of droplets and before commencement of reaction, adding to the aqueous media at least about 0.1 weight percent, based on the weight of the monomer, of gelatin and polymerizing the monomer to form solid polymeric particles.

2. The process of claim 1 wherein a suspension stabilizing agent is present.

3. The process of claim 2 wherein the suspension stabilizing agent is a surfactant or a particulate.

4. The proces of claim 3 wherein the suspension stabilizing agent is a surfactant.

5. The process of claim 4 wherein the surfactant is sodium dioctyl sulfosuccinate.

6. The process of claim 1 wherein the gelatin is added in an amount of at least 0.5 by percent weight based on the weight of the monomer.

7. The process of claim 1 wherein a nonreactive compound more hydrophobic than the ethylenically unsaturated monomer is added to the monomer droplets.

8. The process of claim 7 wherein the nonreactive compound has a $\log P_{(calc)}$ at least 1 greater than the $\log P_{(calc)}$ of the monomer.

9. The process of claim 8 wherein the nonreactive compound has a $\log P_{(calc)}$ at least 3 greater than the $\log P_{(calc)}$ of the monomer.

10. The process of claim 7 wherein the nonreactive compound is hexadecane.

11. A process of making polymeric matte bead particles for use in photographic elements which comprises forming a suspension of ethylenically unsaturated monomer droplets in an aqueous media containing a surfactant stabilizing agent, subsequent to the formation of the droplets and before commencement of reaction adding at least about 0.1 weight percent, based on the weight of the monomer, of gelatin and polymerizing the monomer to form solid polymeric particles.

12. The process of claim 11 wherein a nonreactive compound more hydrophobic than the ethylenically unsaturated monomer is added to the monomer droplets.

13. The process of claim 12 wherein the nonreactive compound has a logP(calc) at least 3 greater than the logP(calc) of the monomer.

14. The process of claim 13 wherein the nonreactive compound is hexadecane.

15. The process of claim 9 wherein the nonreactive compound is added in an amount of 0.01 to 5 percent by weight based on the weight of the monomer.

16. The process of claim 13 wherein the nonreactive compound is added in an amount of 0.01 to 5 percent by weight based on the weight of the monomer.

* * * * *